Figure 1:
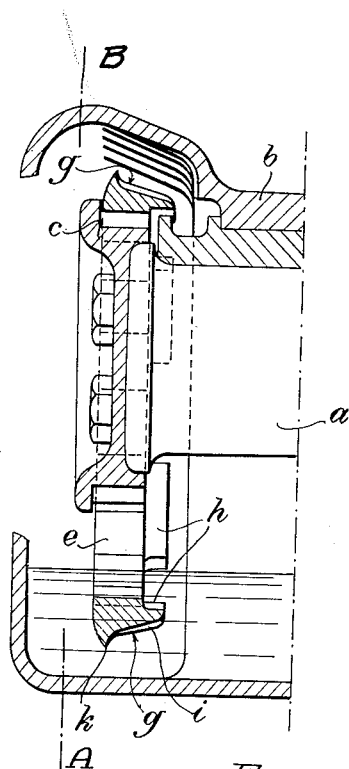

June 26, 1934.  W. PEYINGHAUS  1,964,135
RING LUBRICATOR
Filed Jan. 2, 1932

W. Peyinghaus
INVENTOR

By Marks & Clerk
ATTYS.

Patented June 26, 1934

1,964,135

UNITED STATES PATENT OFFICE 1,964,135

RING LUBRICATOR

Walter Peyinghaus, Egge, near Volmarstein-on-the-Ruhr, Germany

Application January 2, 1932, Serial No. 584,485
In Germany January 2, 1931

6 Claims. (Cl. 308—85)

It has already been proposed in ring lubricating arrangements for the axle bearings of rail vehicles to provide the lubricating ring and the pinion on which it is suspended with teeth which, in the case of increased resistance, for instance when a viscous oil is being used ensure the ring being carried round. It has also been proposed to relieve these teeth from the weight of the ring, the stripper and the pressure of the latter by providing adjacent to and parallel with the teeth cylindrical supporting surfaces or by making the crowns of the teeth and the gaps between the teeth semi-circular. These expedients, however, all entail losses through sliding friction both at the flanks of the teeth and at the stripper, which may cause the running resistance of a vehicle for instance of a tramway trailer to be increased to such an extent that it can no longer be pushed by hand at the reversing places.

The object of the invention is to overcome these disadvantages by supporting the ring instead of by ordinary gear teeth by knife edges and wide-angled notches in the manner of a scale beam, the ring swinging without sliding friction from one knife edge to another and a contact at the flank only occurring when the ring swings to one side of the axis of the bearing owing to it encountering an increased resistance in the oil.

Furthermore the arrangement according to the invention avoids the friction produced directly and indirectly by the wiper by allowing the oil carried along by it to pour, in the case of low speeds of revolution, laterally over the inclined and fluted external surface of the lubricating ring by means of special extensions (lugs) which project beyond the bearing brass, or, in the case of higher speeds of revolution, to be thrown off from horn-shaped centrifugal collars of the ring against the wall of the casing in a known manner, from where it also flows to the collecting trough of the bearing brass. The lateral pointed extensions have the further office, within certain speed ranges where the oil has a tendency to form threads at certain grades of viscosity, of laying these oil threads over the projecting part of the bearing brass and breaking them off. For preventing the lubricating ring swinging too violently in a plane perpendicular to the axis of the bearing, narrow guiding ribs are provided at either side of the longitudinal centre of the axle bearing on bosses provided on the casing, which may be replaced by rollers. These guides only come in contact with the outer surface of the ring temporarily in the case of strong oscillating motions occurring. In this case they act as wipers and convey the oil over the casing ribs or through trickling off directly into the projecting part of the bearing brass.

Figure 2:
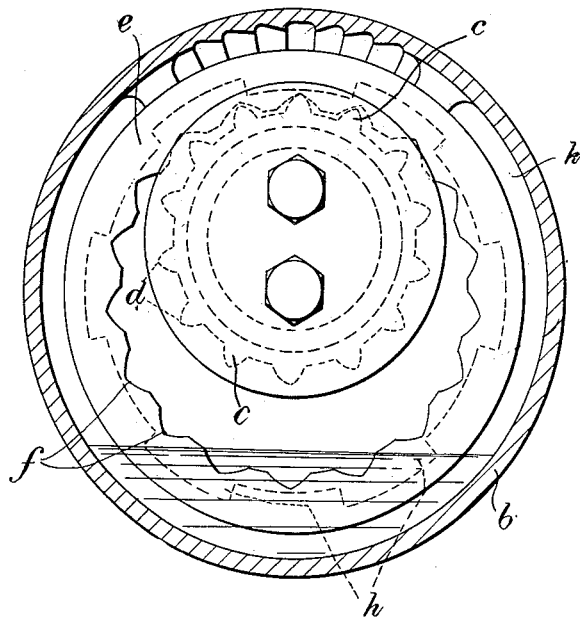
Figure 3:
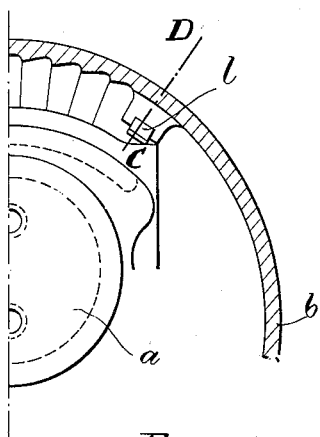
Figure 4:
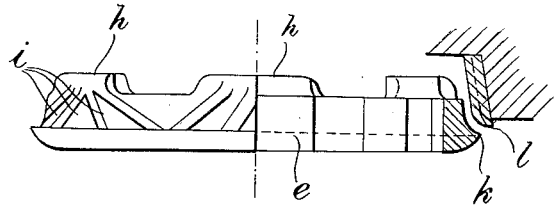

The accompanying drawing illustrates a constructional example of the invention,

Fig. 1 being a longitudinal section through the front part of the axle bearing,

Fig. 2 a cross-section through the oil collector on line A—B, viewing the bearing from the front, Fig. 3 the same cross-section with the ring and pinion removed and Fig. 4 to the left a plan view of the ring and to the right a cross-section through the ring and the casing on line C—D.

In the various figures $a$ is the axle journal, $b$ the casing of the bearing bush with the bearing brass, $c$ the pinion fixed by screws to the end of the journal, $d$ the points of the pinion teeth, $e$ the lubricating ring, $f$ the troughs between its teeth, $g$ the outer surface of the ring, $h$ the inwardly projecting lugs which collect the oil at low speeds in grooves $i$ and pour it out laterally into the trough of the bearing brass, $i$ the downwardly extending collecting grooves on the outer surface of the ring $k$ the centrifugal collar and $l$ the lateral guiding ribs on the casing, which limit the deflection of the ring in a plane perpendicular to the axis of the bearing when the viscosity of the oil opposes considerable resistance to the passage of the ring through it, thereby causing the teeth of the pinion $c$ and the notches $f$ in the lubricating ring $e$ to come into action like spur gearing and rotate the ring by a positive drive. At the same time the ribs or rollers $b$ wipe the oil off the ring.

The ring lubricating arrangement operates in such a manner that only when considerable resistance is offered to pulling the ring through the oil, that is to say, when the oil is viscous, is there any wiping action between the outer periphery of the ring $e$ and the lateral guiding ribs $l$ and sliding friction has to be overcome in driving it. When the oil is only slightly viscous, the arrangement operates without a stripper and free from sliding friction, the oil collecting at low speeds of revolution by means of grooves on the lugs and flowing laterally into the trough of the bearing brass, while at higher speeds of revolution it is thrown off from the collars against the upper part of the casing wall from where it drips in a known manner by means of catching and collecting grooves into the trough of the brass.

What I claim is:

1. A ring lubricator arrangement for the axle bearings of rail vehicles, comprising in combination an externally toothed pinion fixed to the end of the axle journal and an internally toothed lubricating ring capable of riding on the said pinion, the heads of the pinion teeth being in the form of knife edges and the gaps between the ring teeth in the form of notches, the angle of these notches being so wide, relatively to the angular width of the teeth of the pinion, that when the oil does not oppose much resistance to the motion of the lubricating ring this ring is only supported by the vertices of the notches resting upon the tips of the teeth of the pinion, and swings from the tip of one tooth to the tip of the next substantially without contact at any other point.

2. A ring lubricator arrangement comprising in combination a bearing brass, an externally toothed pinion fixed to the end of the axle journal, an internally toothed lubricating ring capable of riding on the said pinion, the heads of the pinion teeth being in the form of knife edges and the gaps between the ring teeth in the form of notches, for enabling the ring to run almost without friction on the pinion, a collar on the end of the bearing brass, the outer peripheral surface of the ring tapering inwards towards the bearing centre and having inwardly extending lugs overhanging the said collar, as and for the purpose set forth.

3. A ring lubricator arrangement as claimed in claim 2, and having collecting and overflow grooves on the outer peripheral surface of the ring, converging at the ends of the lugs, as and for the purpose set forth.

4. A ring lubricator ararngement as claimed in claim 2 and having a raised oil-throwing ridge of V-shaped cross-section on the outer edge of the external peripheral surface of the ring, as and for the purpose set forth.

5. A ring lubricator arrangement for the axle bearings of rail vehicles, comprising in combination an externally toothed pinion fixed to the end of the axle journal, an internally toothed lubricating ring capable of riding on the said pinion, the heads of the pinion teeth being in the form of knife-edges and the gaps between the ring teeth in the form of wide-angled notches, for enabling the ring to swing from the tip of one tooth to the tip of the next except when the oil resistance necessitates a driving of the ring by the pinion in the manner of toothed gearing, a bearing casing, and removable ribs in the upper part of the casing at either side of the vertical longitudinal plane passing through the axis of the bearing, against which the ring can bear with its outer surface for preventing it from swinging excessively in a plane perpendicular to the axis of the bearing, as and for the purpose set forth.

6. A ring lubricator arrangement for the axle bearings of rail vehicles, comprising in combination an externally toothed pinion fixed to the end of the axle journal and an internally toothed lubricating ring capable of riding on the said pinion, the heads of the pinion teeth being in the form of knife edges and the gaps between the ring teeth in the form of notches, the angle of these notches being so wide, relatively to the angular width of the teeth of the pinion, that when the oil does not oppose much resistance to the motion of the lubricating ring this ring is only supported by the vertices of the notches resting upon the tips of the teeth of the pinion, and swings from the tip of one tooth to the tip of the next substantially without contact at any other point, whereas when the oil opposes considerable resistance to motion the pinion drives the lubricating ring like ordinary toothed gearing.

WALTER PEYINGHAUS.